United States Patent
Millar

(10) Patent No.: US 10,842,085 B2
(45) Date of Patent: Nov. 24, 2020

(54) SYSTEMS AND METHODS FOR DETERMINING SEED LEVELS IN A GROW POD

(71) Applicant: Grow Solutions Tech LLC, Lehi, UT (US)

(72) Inventor: Gary Bret Millar, Highland, UT (US)

(73) Assignee: GROW SOLUTIONS TECH LLC, Vineyard, UT (US)

( * ) Notice: Subject to any disclaimer, the term of this patent is extended or adjusted under 35 U.S.C. 154(b) by 263 days.

(21) Appl. No.: 15/983,279

(22) Filed: May 18, 2018

(65) Prior Publication Data

US 2018/0359936 A1  Dec. 20, 2018

Related U.S. Application Data

(60) Provisional application No. 62/519,304, filed on Jun. 14, 2017, provisional application No. 62/519,605, filed on Jun. 14, 2017.

(51) Int. Cl.

| | | |
|---|---|---|
| A01G 9/08 | (2006.01) | |
| A01C 15/00 | (2006.01) | |
| G01F 23/00 | (2006.01) | |
| A01F 12/60 | (2006.01) | |
| A01F 25/16 | (2006.01) | |
| A01D 41/12 | (2006.01) | |
| G01F 23/292 | (2006.01) | |
| A01G 31/04 | (2006.01) | |

(52) U.S. Cl.
CPC ............ *A01G 9/083* (2013.01); *A01C 15/006* (2013.01); *A01G 9/085* (2013.01); *G01F 23/0061* (2013.01); *A01D 41/1208* (2013.01); *A01F 12/60* (2013.01); *A01F 25/163* (2013.01); *A01G 31/042* (2013.01); *G01F 23/2928* (2013.01)

(58) Field of Classification Search
CPC ...................................................... A01G 9/083
See application file for complete search history.

(56) References Cited

U.S. PATENT DOCUMENTS

| | | |
|---|---|---|
| 8,159,660 B2 | 4/2012 | Mimeault et al. |
| 9,603,298 B2 | 3/2017 | Wendte et al. |
| (Continued) | | |

FOREIGN PATENT DOCUMENTS

| | | |
|---|---|---|
| EP | 2708859 A1 | 3/2014 |
| WO | 2017011355 A1 | 1/2017 |

OTHER PUBLICATIONS

International Search Report dated Aug. 13, 2018.

*Primary Examiner* — Manuel A Rivera Vargas
(74) *Attorney, Agent, or Firm* — Dinsmore & Shohl LLP

(57) ABSTRACT

A seed level managing system includes a seed tank configured to contain seeds, a plurality of seed level sensors placed on a sidewall of the seed tank, a surface detecting sensor, and a controller. The controller includes one or more processors, one or more memory modules, and machine readable instructions stored in the one or more memory modules that, when executed by the one or more processors, cause the controller to receive first information from the plurality of seed level sensors; receive second information from the surface detecting sensor and determine a number of the seeds in the seed tank based on the first information and the second information.

18 Claims, 8 Drawing Sheets

(56) References Cited

U.S. PATENT DOCUMENTS

| | | | |
|---|---|---|---|
| 2004/0031335 A1* | 2/2004 | Fromme | G01B 11/24 73/865 |
| 2004/0103850 A1 | 6/2004 | Borkgren et al. | |
| 2012/0281096 A1 | 11/2012 | Gellaboina et al. | |
| 2014/0302228 A1 | 10/2014 | Reineccius et al. | |
| 2015/0351314 A1 | 12/2015 | Sauder et al. | |
| 2016/0302353 A1 | 10/2016 | Wendte et al. | |
| 2017/0086355 A1 | 3/2017 | Borkgren et al. | |

* cited by examiner

SYSTEMS AND METHODS FOR DETERMINING SEED LEVELS IN A GROW POD

CROSS REFERENCE TO RELATED APPLICATIONS

This application claims the benefit of U.S. Provisional Patent Application Nos. 62/519,605 and 62/519,304 all filed on Jun. 14, 2017, the entire contents of which are herein incorporated by reference.

TECHNICAL FIELD

Embodiments described herein generally relate to systems and methods for determining a seed level for a grow pod and, more specifically, to determining a seed level in a seed tank using a plurality of sensors.

BACKGROUND

While crop growth technologies have advanced over the years, there are still many problems in the farming and crop industry today. As an example, while technological advances have increased efficiency and production of various crops, many factors may affect a harvest, such as weather, disease, infestation, and the like. Additionally, while the United States currently has suitable farmland to adequately provide food for the U.S. population, other countries and future populations may not have enough farmland to provide the appropriate amount of food.

Seed tanks store seed and need to be replenished with seeds periodically. However current solutions in the farming industry have no need to accurately determine used and unused seeds or otherwise do not do so accurately. Thus, a system for determining a level of seeds in a seed tank may be needed.

SUMMARY

In one embodiment, a seed level managing system is provided. The system includes a seed tank configured to contain seeds, a plurality of seed level sensors placed on a sidewall of the seed tank, a surface detecting sensor, and a controller. The controller includes one or more processors, one or more memory modules, and machine readable instructions stored in the one or more memory modules that, when executed by the one or more processors, cause the controller to receive first information from the plurality of seed level sensors, receive second information from the surface detecting sensor, and determine a number of the seeds in the seed tank based on the first information and the second information.

In another embodiment, a controller for managing a seed level in a seed tank is provided. The controller includes one or more processors, one or more memory modules, and machine readable instructions stored in the one or more memory modules that, when executed by the one or more processors, cause the controller to receive first information from a plurality of seed level sensors; receive second information from a surface detecting sensor and determine a number of the seeds in the seed tank based on the first information and the second information.

In another embodiment, a method of managing a seed level in a seed tank is provided The method includes receiving, by a controller of a grow pod system, first information from a plurality of seed level sensors, receiving, by the controller of the grow pod system, second information from a surface detecting sensor, determining, by the controller of the grow pod system, a number of the seeds in the seed tank based on the first information and the second information, receiving, by the controller of the grow pod system, a rate of seeds being provided in an assembly line grow pod, and determining, by the controller of the grow pod system, a time for supplementing the seeds in the seed tank based on the number of seeds in the seed tank and the rate of seeds being provided in the assembly line grow pod.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems for determining a level seeds in a seed tank. The system includes a seed tank configured to contain seeds, a plurality of seed level sensors placed on a sidewall of the seed tank, a surface detecting sensor, and a controller. The controller includes one or more processors, one or more memory modules, and machine readable instructions stored in the one or more memory modules that, when executed by the one or more processors, cause the controller to: receive first information from the plurality of seed level sensors; receive second information from the surface detecting sensor; and determine a number of the seeds in the seed tank based on the first information and the second information. The system may effectively monitor the level of seeds in seed tanks and replenish seeds in seed tanks in a timely manner.

Figure 1:
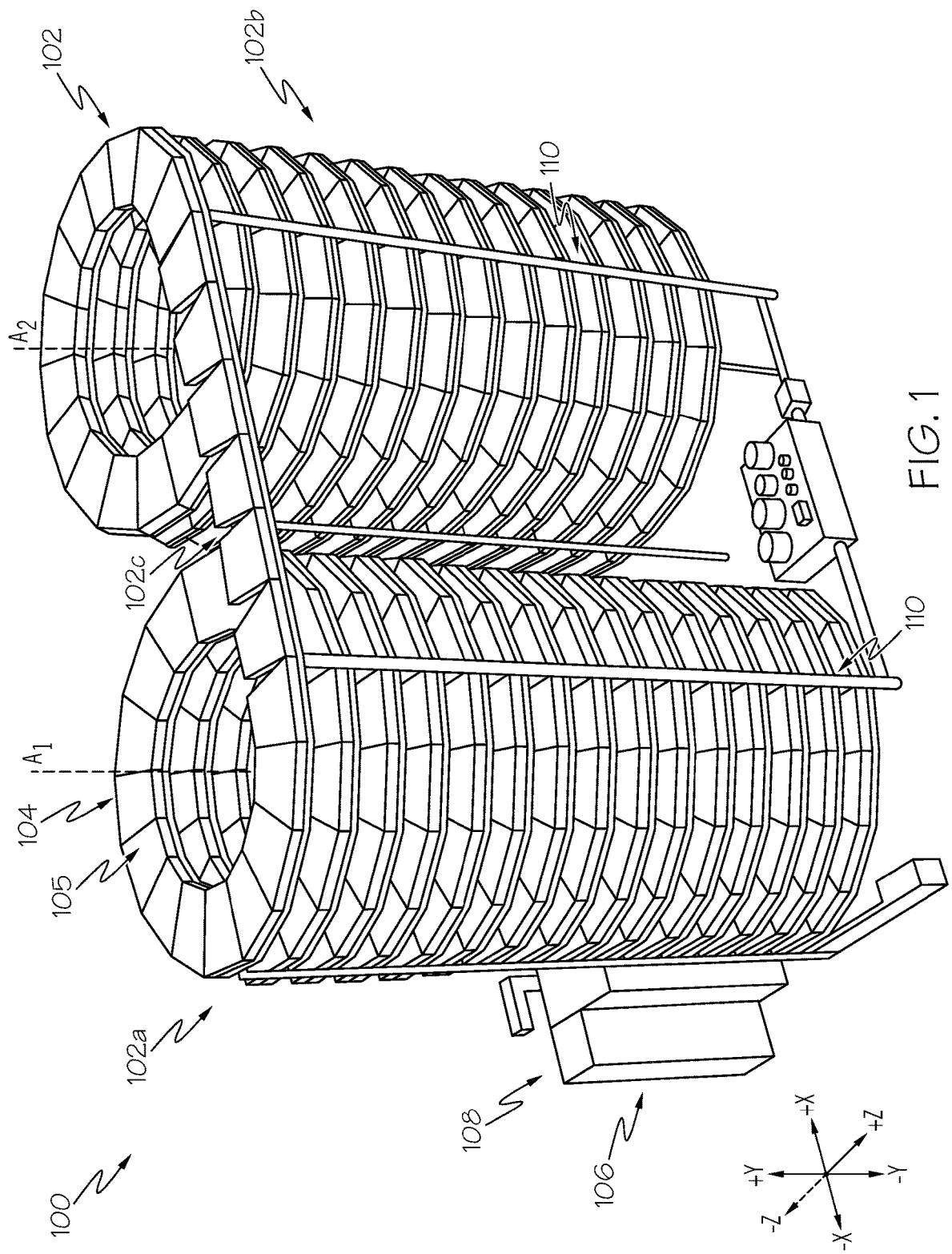
FIG. 1 depicts an assembly line grow pod, according to embodiments described herein.

Referring now to the drawings, FIG. 1 depicts an assembly line grow pod 100, according to embodiments described herein. As illustrated, the assembly line grow pod 100 may include a track 102 that holds one or more carts 104, each cart having one or more trays 105 thereon. The track 102 may include an ascending portion 102a, a descending portion 102b, and a connection portion 102c. The track 102 may wrap around, in a counterclockwise direction in FIG. 1, a first axis such that the carts 104 ascend upward in a vertical direction. In other embodiments, clockwise or other configurations are available. The connection portion 102c may be relatively level (although this is not a requirement) and is utilized to transfer carts 104 (and the trays 105 thereon) to the descending portion 102b. The descending portion 102b may be wrapped around a second axis (again in a counter-clockwise direction in FIG. 1) that is substantially parallel to the first axis, such that the carts 104 may be returned closer to ground level.

While not explicitly illustrated in FIG. 1, the assembly line grow pod 100 may also include a plurality of lighting devices, such as light emitting diodes (LEDs). The lighting devices may be disposed on the track 102 opposite the carts 104, such that the lighting devices direct light waves to the carts 104 on the portion the track 102 directly below. In some embodiments, the lighting devices are configured to create a plurality of different colors and/or wavelengths of light, depending on the application, the type of plant being grown, and/or other factors. While in some embodiments, LEDs are utilized for this purpose, this is not a requirement. Any lighting device that produces low heat and provides the desired functionality may be utilized.

Also depicted in FIG. 1 is a master controller 106. The master controller 106 may include a computing device and various control modules for controlling various components of the assembly line grow pod 100 such as a nutrient dosing control module, a water distribution control module, etc. As an example, control modules for controlling a water distribution control module, a nutrient distribution control module, an air distribution control module, etc. may be included as part of the master controller 106 which may provide a modular control interface. The modular control interface of the master controller 106 enables removal, replacement, upgrade and expansion of each control module without changing or affecting the operations of other control modules, or shutting down the master controller 106 or other components of the assembly line grow pod 100.

In some embodiments, the master controller 106 may store a master recipe for plants that may dictate the timing and wavelength of light, pressure, temperature, watering, nutrients, molecular atmosphere, and/or other variables the optimize plant growth and output. For example, the master recipe dictates lighting requirements on the third day of a particular plant at the assembly line grow pod 100, different lighting requirements on the fourth day of the plant, etc. As another example, the master recipe dictates watering needs, nutrient feeds, etc. directed to plants carried on the carts at particular locations for a particular day counted from the date that plants are introduced into the assembly line grow pod 100. The master recipe is specific, extensive and customized to cover plants supported by the assembly line grow pod 100. By way of example only, the recipe may have instructions to assist 1500 carts simultaneously operating in the assembly line grow pod 100 and carrying diverse population of plants. In some embodiments, the master controller 106 may store specific recipes such as a watering recipe, a nutrient recipe, a dosage recipe, a wave recipe, a temperature recipe, a pressure recipe, etc.

In some embodiments, the master recipe may take any form of a structured set of data, a database, etc. such that data is organized into rows, columns, and table. Additionally, or alternatively, the master recipe and the wave recipe may be structured to facilitate the storage, retrieval, modification, addition, and deletion of data through data processing operations.

In some embodiments, the master controller 106 reads information from the master recipe and adjust the information based on known locations of plants at the assembly line grow pod 100. For example, the master controller 106 may identify the plants location based on a cart identifier which is indicative of the growth stage of the plants in the assembly line grow pod 100. Once plants enter into the assembly line grow pod 100, plants move along the spiral tracks from the ascending side to the descending side until plants arrive at the harvest stage. Thus, the location of the carts carrying plants may indicate the growth stage of plants at the assembly line grow pod 100. Then, the master controller 106 may apply the master recipe relevant to the stage of the plants, such as lighting, watering, pressure, and/or wave requirements, specific to plants growing on the fourth day at the assembly line grow pod 100.

The master controller 106 processes the master recipe and controls various components of the assembly line grow pod 100. To reduce the processing load, for example, processing the master recipe and all related events for a large number of simultaneously operating carts carrying the diverse population of plants, the master controller 106 may distribute different and specific functions to several control modules, such as a valve controller, a dosage controller, a pump controller, etc. These control modules work autonomously, complete task(s) and report to the master controller 106. In some embodiments, the control modules may be configured as hardware modules with their own set of instructions in order to improve stability and avoid pushed updates and modifications. In other embodiments, other configurations of the control modules are available.

Figure 2:
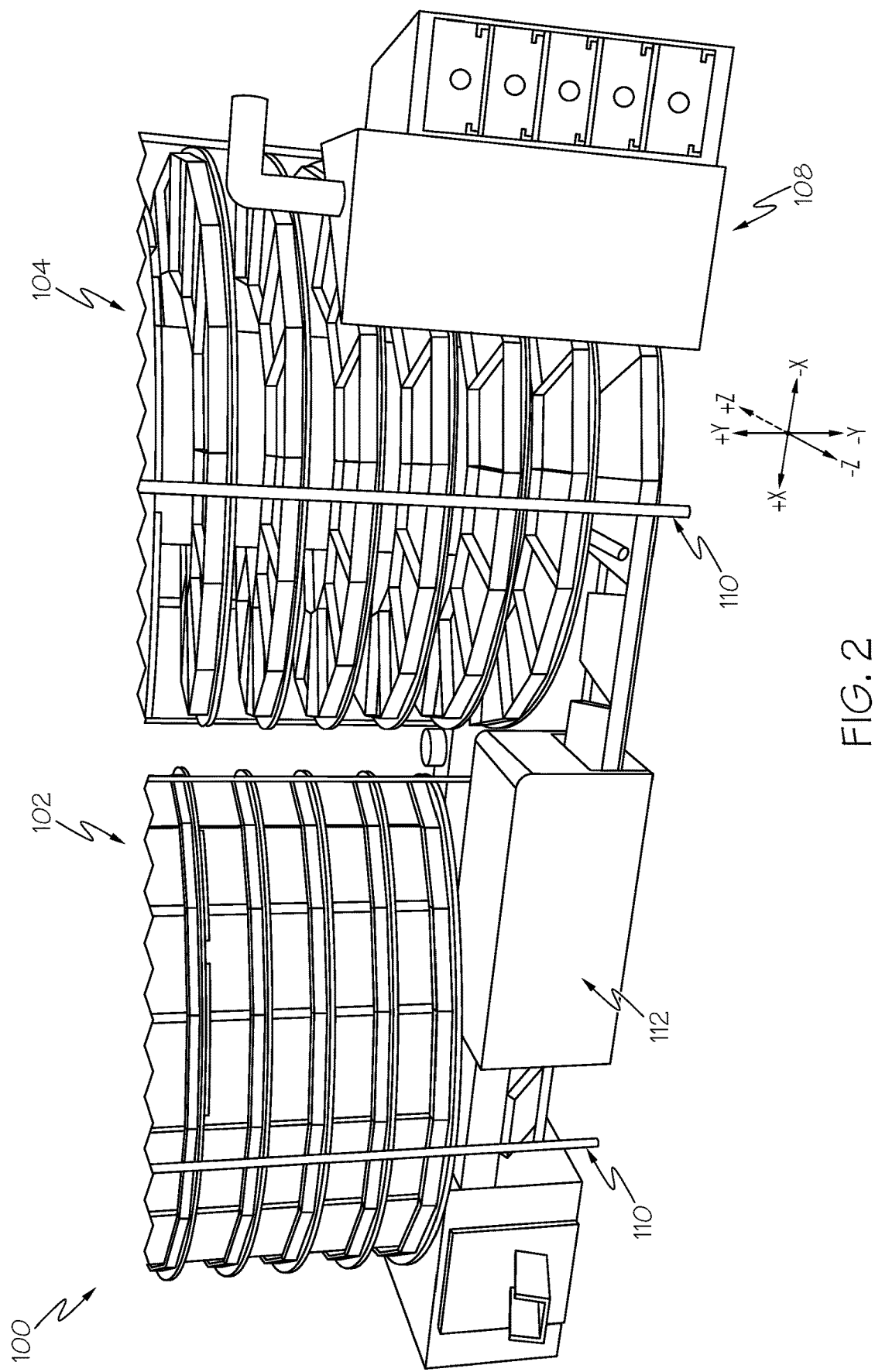
FIG. 2 depicts components in an assembly line grow pod, according to embodiments described herein.

Coupled to the master controller 106 is a seeder component 108, as shown in FIG. 2. The seeder component 108 may be configured to seed each tray 105 on the one or more carts 104 as the carts 104 pass the seeder in the assembly line. In some embodiments, each cart 104 may include a single section tray for receiving a plurality of seeds. In other embodiments, a multiple section tray may be used to receive individual seeds in each section (or cell). In the embodiments with the single section tray, the seeder component 108 may detect presence of the respective cart 104 and may begin laying seed across an area of the single section tray. The seed may be laid out according to a desired depth of seed, a desired number of seeds, a desired surface area of seeds, and/or according to other criteria. In some embodiments, the seeds may be pre-treated with nutrients and/or anti-buoyancy agents (such as water) as these embodiments may not utilize soil to grow the seeds and thus might need to be submerged.

In the embodiments where the multiple section tray is utilized with one or more of the carts 104, the seeder component 108 may be configured to individually insert seeds into one or more of the sections of the tray. Again, the seeds may be distributed on the tray (or into individual cells) according to a desired number of seeds, a desired area the seeds should cover, a desired depth of seeds, etc.

The watering control module may be coupled to one or more water lines 110, which distribute water and/or nutrients to one or more trays at predetermined areas of the assembly line grow pod 100. In some embodiments, seeds may be sprayed to reduce buoyancy and then flooded. Additionally, water usage and consumption may be monitored utilizing various sensors coupled to each tray 105, such that at subsequent watering stations, this data may be utilized to determine an amount of water to apply to a seed at that time.

It should be understood that while the embodiment of FIG. 1 depicts an assembly line grow pod 100 that wraps around a plurality of axes, this is merely one example. FIGS. 1 and 2 illustrate a two towers structure of the assembly line grow pod 100, but in other embodiments, a four towers structure is available. In addition, any configuration of assembly line or stationary grow pod may be utilized for performing the functionality described herein.

Figure 3:
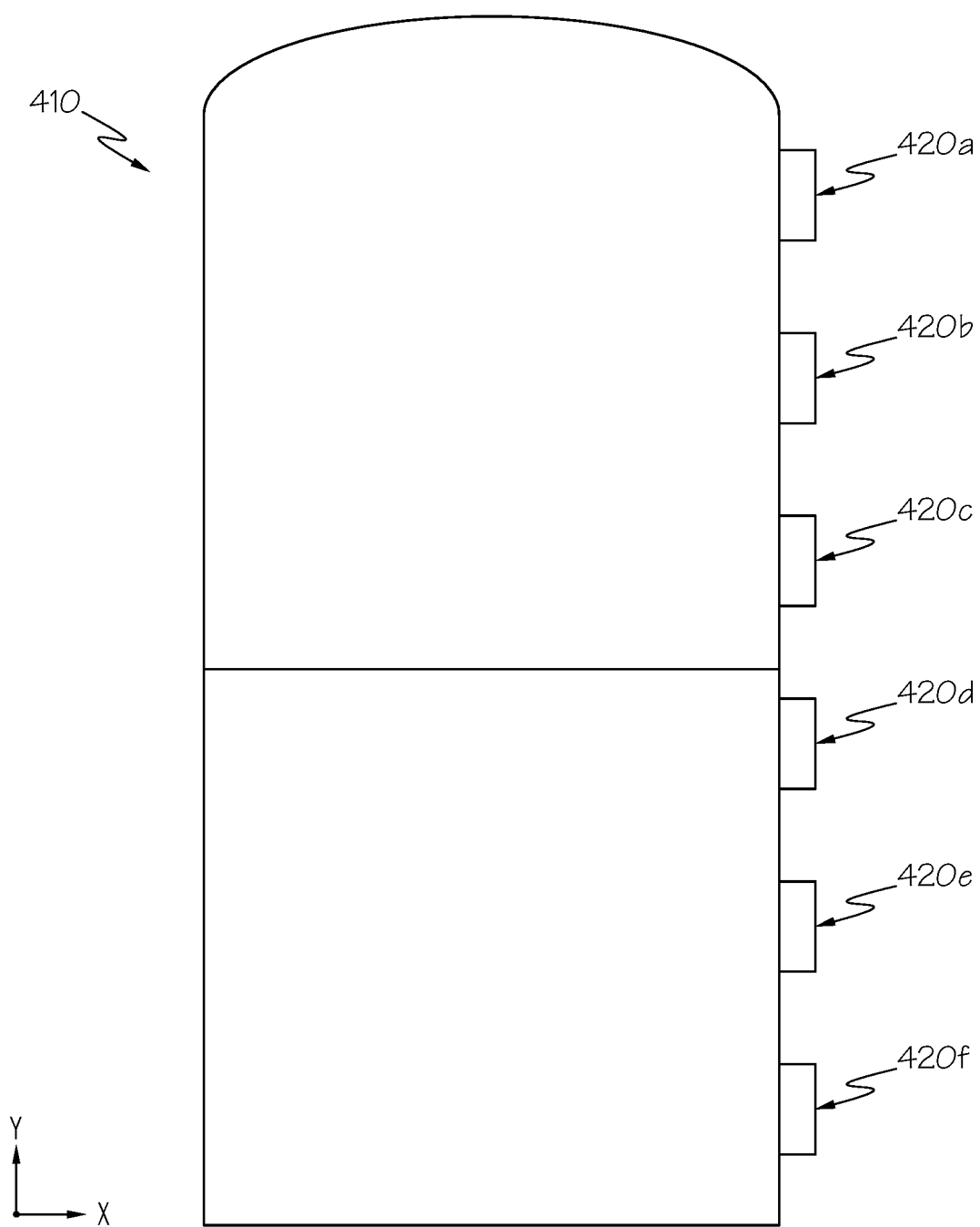
FIG. 3 depicts a seed tank having a plurality of sensors, according to embodiments described herein.

FIG. 3 depicts a seed tank according to embodiments described herein. The seed tank 410 provides seeds to the seeder component 108 in FIG. 1, and the seed level in the seed tank 410 decreases as the seed tank 410 provides seeds to the seeder component 108. The seed tank 410 may be a cylindrical-shaped tank, and a plurality of sensors may be placed on the wall of the seed tank. For example, as shown in FIG. 3, sensors 420a, 420b, 420c, 420d, 420e, and 420f are placed on the sidewall of the seed tank 410. In embodiments, the sensors 420a, 420b, 420c, 420d, 420e, and 420f are aligned on a vertical line parallel to y axis.

While FIG. 3 depicts six sensors, more than or less than sensors are placed on the wall of the seed tank 410. The sensors 420a through 420f are positioned at different heights with respect to the seed tank 410. For example, the sensor 420f is positioned at ⅙ of the height of the seed tank 410, the sensor 420e is positioned at ⅖ of the height of the seed tank 410, the sensor 420d is positioned at ⅜ of the height of the seed tank 410, the sensor 420c is positioned at ⅘ of the height of the seed tank 410, the sensor 420b is positioned at ⅝ of the height of the seed tank 410, and the sensor 420a is positioned at 6/6 of the height of the seed tank 410. The sensors 420a through 420f may be located at different locations than the above example. For example, the sensor 420f may be positioned at ⅐ of the height of the seed tank 410, and the sensor 420e may be positioned at 2/7 of the height of the seed tank 410, etc.

In embodiments, the sensors may be proximity sensors detecting presence of materials inside the seed tank 410. For example, the sensors 420a through 420f may be field effect sensors that detect materials present proximate to each of the sensors 420a through 420f. Each of the sensors 420a through 420f may create an electro-static field that emanates directly through a protective dielectric substrate of the sensors 420a through 420f, and monitor for whatever switching or sensing event the system is designed to detect. As another example, the sensors 420a through 420f may be any other type of proximity sensors, e.g., inductive proximity sensors, capacitive proximity sensors, photoelectric proximity sensors, ultrasonic proximity sensors, etc. The sensors 420a through 420f may output different values depending on whether they detect materials proximate to the sensors 420a through 420f. For example, the sensor 420f may output a binary code 1 when the sensor 420f detects materials proximate to the sensor 420f inside the seed tank 410. The sensor 420f may output a binary code of 0 when the sensor 420f does not detect any material proximate to the sensor 420f inside the seed tank 410.

In FIG. 3, the seed tank 410 is about half-filled with seeds. The sensors 420a, 420b and 420c detect no seeds proximate to the sensors 420a, 420b and 420c, and thus, output data indicating no materials being present proximate to the sensors 420a, 420b and 420c, e.g., a binary code of 0. The sensors 420d, 420e and 420f detect seeds proximate to the sensors 420d, 420e and 420f, and thus, output data indicating materials being present proximate to the sensors 420d, 420e and 420f, e.g., a binary code of 1.

In some embodiments, the sensors may move on the wall of the seed tank 410 in a vertical direction. For example, the wall of the seed tank 410 may include a rail extending in a vertical direction and the sensors 420a through 420f may move along the rail. The sensors may move in a vertical direction to accurately measure the level of top surface of seeds in the seed tank 410. For example, as shown in FIG. 3, the sensor 420d detects seeds proximate to the sensor 420d whereas the sensor 420c does not detect seeds proximate to the sensor 420c. The sensor 420d may move in +y direction until the sensor 420d does not detect the seeds proximate to the sensor 420d. Then, the sensor 420d may transmit the current height level of the sensor 420d to the master controller 106 such that the master controller 106 may determine the seed level in the seed tank 410. Instead of the sensor 420d being moved, the sensor 420c may move in −y direction until the sensor 420c detects the seeds proximate to the sensor 420c. Then, the sensor 420c may transmit the current height level of the sensor 420c to the master controller 106 such that the master controller 106 may determine the seed level in the seed tank 410.

In some embodiments, the master controller 106 may instruct one of the sensors 420a through 420f to move on the wall. For example, if one of two adjacent sensors detects seeds proximate to the sensor and the other of two adjacent sensors does not detect seeds proximate to the corresponding sensor, the master controller 106 may instructs one of the two sensors to move on the wall.

In some embodiments, the seed tank 410 may include a weight sensor for measuring the weight of seeds in the seed tank 410. The master controller 106 may receive the weight of seeds in the seed tank 410 from the weight sensor, and determine the number of seeds in the seed tank based on the weight.

In some embodiments, the seed tank 410 may include one or more sensors that determine the amount of seeds being dispensed from the seed tank, and transmit the amount of seeds being dispensed to the master controller 106. For example, the master controller 106 may store that the number of seeds in the seed tank 410 is 5,000,000. The one or more sensors may transmit an indication that 500,000 seeds have been dispensed from the seed tank. In response, the master controller 106 may update the number of seeds in the seed tank 410 as 4,500,000.

Figure 4:
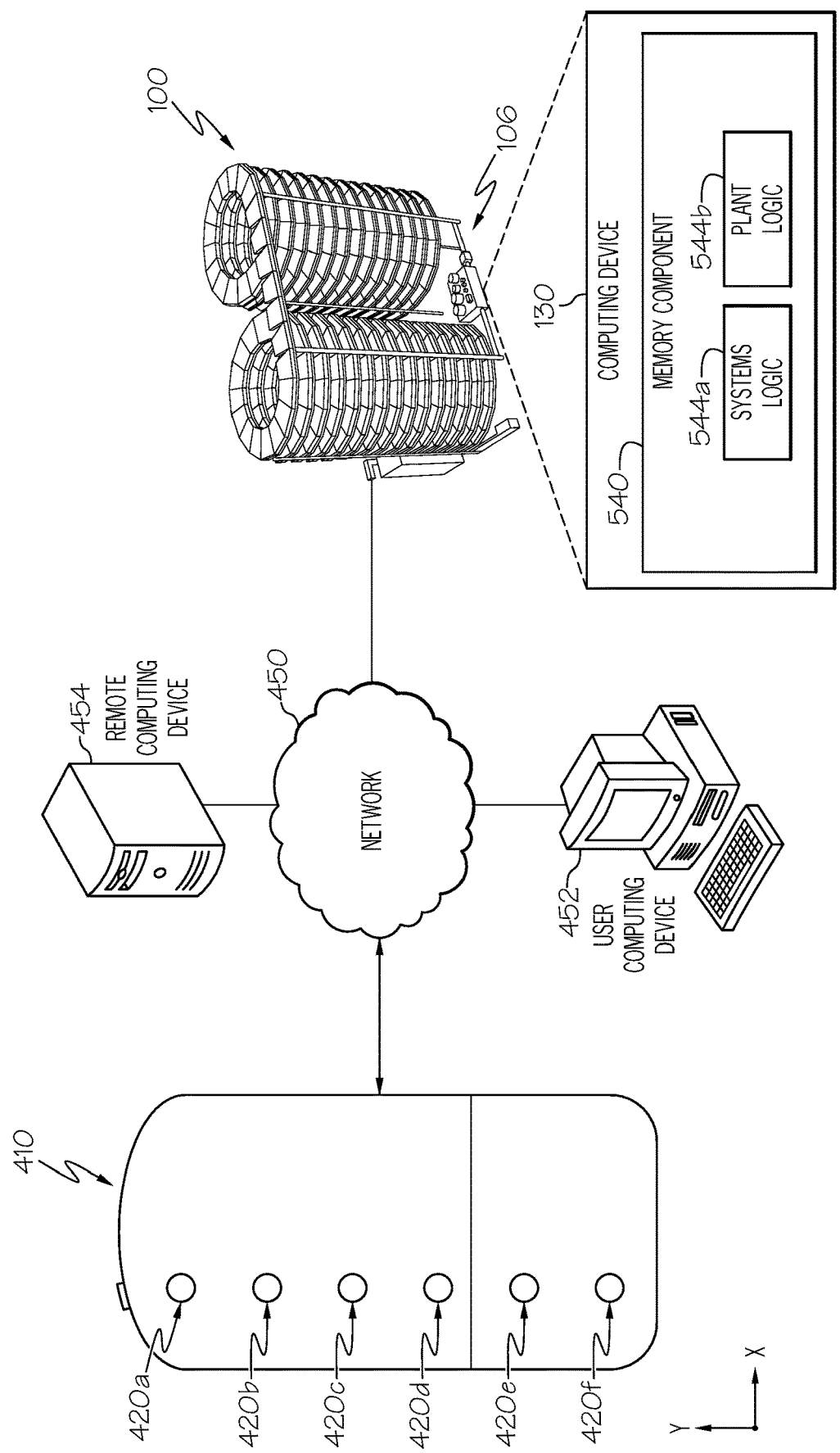
FIG. 4 depicts a seed level determining system, according to embodiments described herein.

FIG. 4 depicts a system for determining the seed level of a seed tank 410 according to embodiments described herein. Each of the sensors 420a through 420f may be coupled to a network 450 and communicate with the master controller 106 through the network 450. Each of the sensors 420a through 420f may transmit data associated with the presence of materials proximate to the sensors 420a through 420f to the master controller 106. For example, the sensors 420a and 420b transmit the binary code of 0 indicating no materials being present proximate to the sensors 420a and 420b to the master controller 106, and the sensors 420c, 420d, 420e, and 420f transmit the binary code of 1 indicating materials being present proximate to the sensors 420c, 420d, 420e, and 420f to the master controller 106. The sensors 420a through 420f may transmit the data along with the identification of the sensors 420a through 420f to the master controller such that the master controller 106 can identify the origination of the data.

As illustrated in FIG. 4, the assembly line grow pod 100 may include a master controller 106, which may include a computing device 130. The computing device 130 may include a memory component 540, which stores systems logic 544a and plant logic 544b. As described in more detail below, the systems logic 544a may monitor and control operations of one or more of the components of the assembly line grow pod 100. The systems logic 544a may monitor and control operations of the seed tank 410. The systems logic 544a may receive data from the sensors 420a through 420f and determine the seed level in the seed tank 410. For example, the systems logic 544a may receive data from the sensors 420a through 420f as shown in table 1 below.

TABLE 1

| Time | 420a | 420b | 420c | 420d | 420e | 420f |
|---|---|---|---|---|---|---|
| May 1  | 0 | 1 | 1 | 1 | 1 | 1 |
| May 6  | 0 | 1 | 1 | 1 | 1 | 1 |
| May 11 | 0 | 0 | 1 | 1 | 1 | 1 |
| May 16 | 0 | 0 | 1 | 1 | 1 | 1 |
| May 21 | 0 | 0 | 0 | 1 | 1 | 1 |

In embodiments, the binary codes of 1 indicate a certain seed level of the seed tank 410. For example, a binary code of 1 received from the sensor 420a indicates 90% or more of the seed tank 410 is filled, a binary code of 1 received from the sensor 420b indicates 75% or more of the seed tank 410 is filled, a binary code of 1 received from the sensor 420c indicates 60% or more of the seed tank 410 is filled, a binary code of 1 received from the sensor 420d indicates 45% or more of the seed tank 410 is filled, a binary code of 1 received from the sensor 420e indicates 30% or more of the seed tank 410 is filled, and a binary code of 1 received from the sensor 420a indicates 15% or more of the seed tank 410 is filled. Thus, the system logic 544a may determine that in May 1, the seed tank 410 is about 75% to 90% filled based on the binary codes received from the sensors 420a through 420f. Similarly, the system logic 544a may determine that in May 6, the seed tank 410 is about 75% to 90% filled based on the binary codes received from the sensors 420a through 420f. The system logic 544a may determine that in May 11, the seed level of the seed tank 410 is reduced to about 60% to 75% based on the binary codes received from the sensors 420a through 420f. The system logic 544a may determine that in May 21, the seed level of the seed tank 410 is reduced to about 45% to 60% based on the binary codes received from the sensors 420a through 420f. Based on the reduction rate of the seed level, the system logic 544a may estimate when the seed tank 410 will be empty.

The plant logic 544b may be configured to determine and/or receive a recipe for seeds in the seed tank 410 and may facilitate implementation of the recipe via the systems logic 544a. For example, if the seed level of the seed tank 410 containing certain seeds decreases because the seed tank 410 provides seeds to the seeder component 108, the plant logic 544b receives a recipe for that certain seeds, and the system logic 544a controls operations of one or more of the components of the assembly line grow pod 100 based on the recipe.

Additionally, the master controller 106 is coupled to a network 450. The network 450 may include the internet or other wide area network, a local network, such as a local area network, a near field network, such as Bluetooth or a near field communication (NFC) network. The network 450 is also coupled to a user computing device 452 and/or a remote computing device 454. The user computing device 452 may include a personal computer, laptop, mobile device, tablet, server, etc. and may be utilized as an interface with a user. As an example, the master controller 106 may send alert notifications to a user of the user computing device 452 if the master controller 106 determines that the seed level of the seed tank 410 is less than a threshold value. While FIG. 3 depicts that the master controller 106 communicates with one seed tank 410, the master controller 106 may communicate with more than one seed tanks such that the master controller 106 can monitor seed levels of a plurality of seed tanks in real time.

Similarly, the remote computing device 454 may include a server, personal computer, tablet, mobile device, etc. and may be utilized for machine to machine communications. As an example, if the master controller 106 determines that the seed level of the seed tank 410 is less than a threshold value, the master controller 106 may communicate with the remote computing device 454 to order seeds to fill in the seed tank 410. As such, some embodiments may utilize an application program interface (API) to facilitate this or other computer-to-computer communications.

Figure 5:
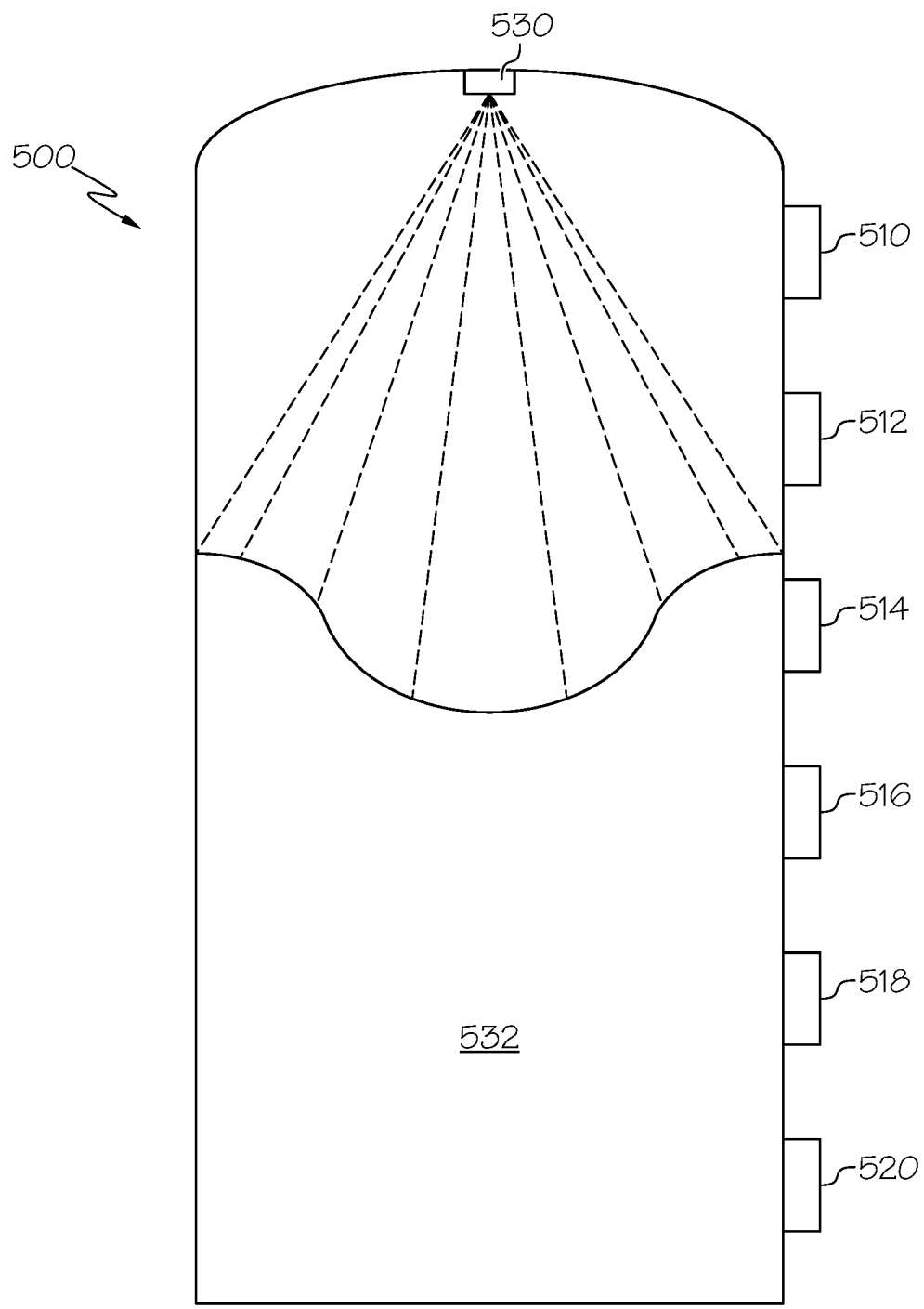
FIG. 5 depicts a seed tank having a plurality of sensors and a surface detecting sensor, according to embodiments described herein.

FIG. 5 depicts a seed tank according to embodiments described herein. The seed tank 500 provides seeds to the seeder component 108 in FIG. 1, and the seed level in the seed tank 500 decreases as the seed tank 500 provides seeds to the seeder component 108. The seed tank 500 may be a cylindrical-shaped tank, and a plurality of sensors may be placed on the wall of the seed tank. For example, as shown in FIG. 5, sensors 510, 512, 514, 516, 518, and 520 are placed on the wall of the seed tank 500. While FIG. 5 depicts six sensors, more than or less than sensors are placed on the wall of the seed tank 500.

In embodiments, the sensors may be proximity sensors detecting presence of materials inside the seed tank 500. For example, the sensors 510, 512, 514, 516, 518, and 520 may be field effect sensors that detect materials present proximate to each of the sensors 510, 512, 514, 516, 518, and 520. Each of the sensors 510, 512, 514, 516, 518, and 520 may create an electro-static field that emanates directly through a protective dielectric substrate of the sensors 510, 512, 514, 516, 518, and 520, and monitor for whatever switching or sensing event the system is designed to detect. As another example, the sensors 510, 512, 514, 516, 518, and 520 may be any other type of proximity sensors, e.g., inductive proximity sensors, capacitive proximity sensors, photoelectric proximity sensors, ultrasonic proximity sensors, etc. The sensors 510, 512, 514, 516, 518, and 520 may output different values depending on whether they detect materials proximate to the sensors 510, 512, 514, 516, 518, and 520. For example, the sensor 520 may output a binary code 1 when the sensor 520 detects materials proximate to the sensor 520 inside the seed tank 500. The sensor 520 may output a binary code of 0 when the sensor 520 does not detect any material proximate to the sensor 520 inside the seed tank 500.

In embodiments, the seed tank 500 includes a surface detecting sensor 530. The surface detecting sensor 530 may be laser scanners, capacitive displacement sensors, Doppler Effect sensors, eddy-current sensors, ultrasonic sensors, magnetic sensors, optical sensors, radar sensors, sonar sensors, LIDAR sensors or the like. The surface detecting sensor 530 may be positioned on the top of the seed tank 500. The surface detecting sensor 530 may detect the top surface of seeds 532 in the seed tank 500. For example, the surface detecting sensor 530 may detect a 3-dimensional surface of the seeds, and send information about the 3-dimension surface to the master controller 106.

Figure 6:
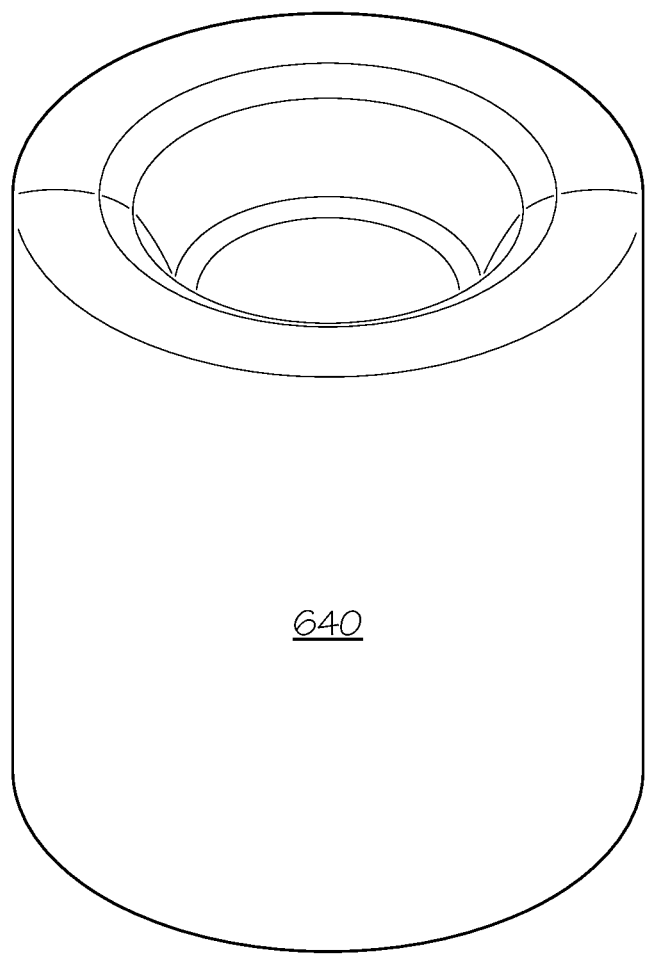
FIG. 6 depicts a three dimensional shape of seeds in a seed tank, according to embodiments described herein.

The master controller 106 may determine the volume of the seeds based on information from the sensors 510, 512, 514, 516, 518, and 520 and information from the surface detecting sensor 530. For example, the master controller 106 may simulate a 3-dimensional shape of seeds in the seed tank 500, e.g., the 3-dimensional shape 640 as shown in FIG. 6, based on the information from the sensors 510, 512, 514, 516, 518, and 520 and information from the surface detecting sensor 530. Then, the master controller 106 may calculate the number of seeds in the seed tank 500 based on the 3-dimensional shape. For example, if the volume of the 3-dimensional shape is 40 cubic meters, and 1 cubic meter contains 100,000 seeds for plant A, the master controller 106 calculates the number of seeds for plant A is 4,000,000. The master controller 106 may accurately calculate the number of seeds in the seed tank by determining the 3-dimensional shape of the seeds in the tank.

Figure 7:
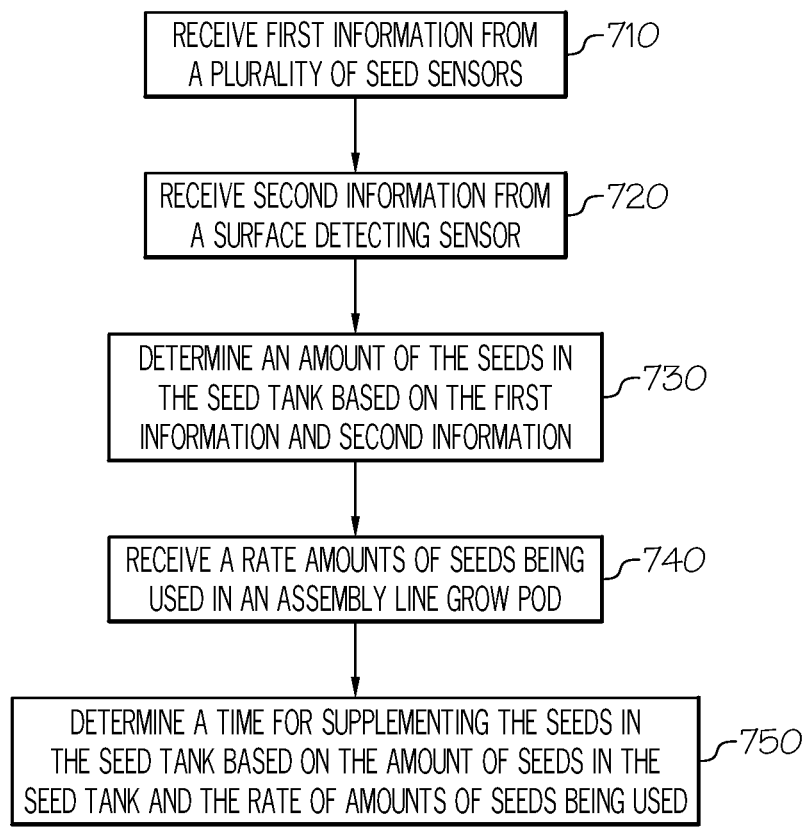
FIG. 7 depicts a flowchart for determining a seed level in a seed tank and a time for supplementing seeds, according to embodiments described herein.

FIG. 7 depicts a flowchart for managing a seed level in a seed tank, according to embodiments shown and described herein. In block 710, the master controller 106 receives first information from a plurality of seed level sensors attached on the side wall of a seed tank. In embodiments, the master controller 106 receives information from the sensors 510, 512, 514, 516, 518, and 520. For example, the master controller 106 receives the binary code of 1 from the sensors 514, 516, 518, and 520 and the binary code of 0 from the sensors 510 and 512. Based on the information, the master controller 106 determines that the seed tank 500 is filled with seeds 532 at least up to the level of the sensor 514. In embodiments where the sensors may move on the wall of the seed tank, one of the sensors may send the accurate filled level of seeds to the master controller 106.

In block 720, the master controller 106 receives second information from a surface detecting sensor. In embodiments, the master controller 106 receives a 3-dimensional shape of the top surface of the seeds in the seed tank 500 from the surface detecting sensor 530.

In block 730, the master controller 106 determines an amount of the seeds in the seed tank based on the first information and the second information. In embodiments, the master controller 106 determines the volume of the seeds in the seed tank 500 based on the first information and the second information. For example, the master controller 106 simulates a 3-dimensional shape of seeds in the seed tank 500, e.g., as shown in FIG. 6, based on the information from the sensors 510, 512, 514, 516, 518, and 520 and information from the surface detecting sensor 530. Then, the master controller 106 may calculate the number of seeds in the seed tank 500 based on the 3-dimensional shape. For example, if the volume of the 3-dimensional shape is 40 cubic meter, and 1 cubic meter contains 100,000 seeds for plant A, the master controller 106 calculates the number of seeds for plant A is 4,000,000.

In block 740, the master controller 106 receives a rate of amounts of seeds being seeded in an assembly line grow pod 100. In embodiments, the master controller 106 may receive a rate of amounts of seeds being seeded in carts from the seeder component 108. For example, the seeder component 108 seeds 100 seeds per minute and transmits the rate to the master controller 106.

In block 750, the master controller 106 determines a time for supplementing the seeds in the seed tank 500 based on the amount of seeds in the seed tank 500 and the rate of amounts of seeds being used. For example, if the number of seeds in the seed tank is 4,000,000 and the seeder component 108 seeds 100 seeds per minute, the master controller 106 determines that the seed tank 500 needs to be supplemented in about 27 days.

Figure 8:
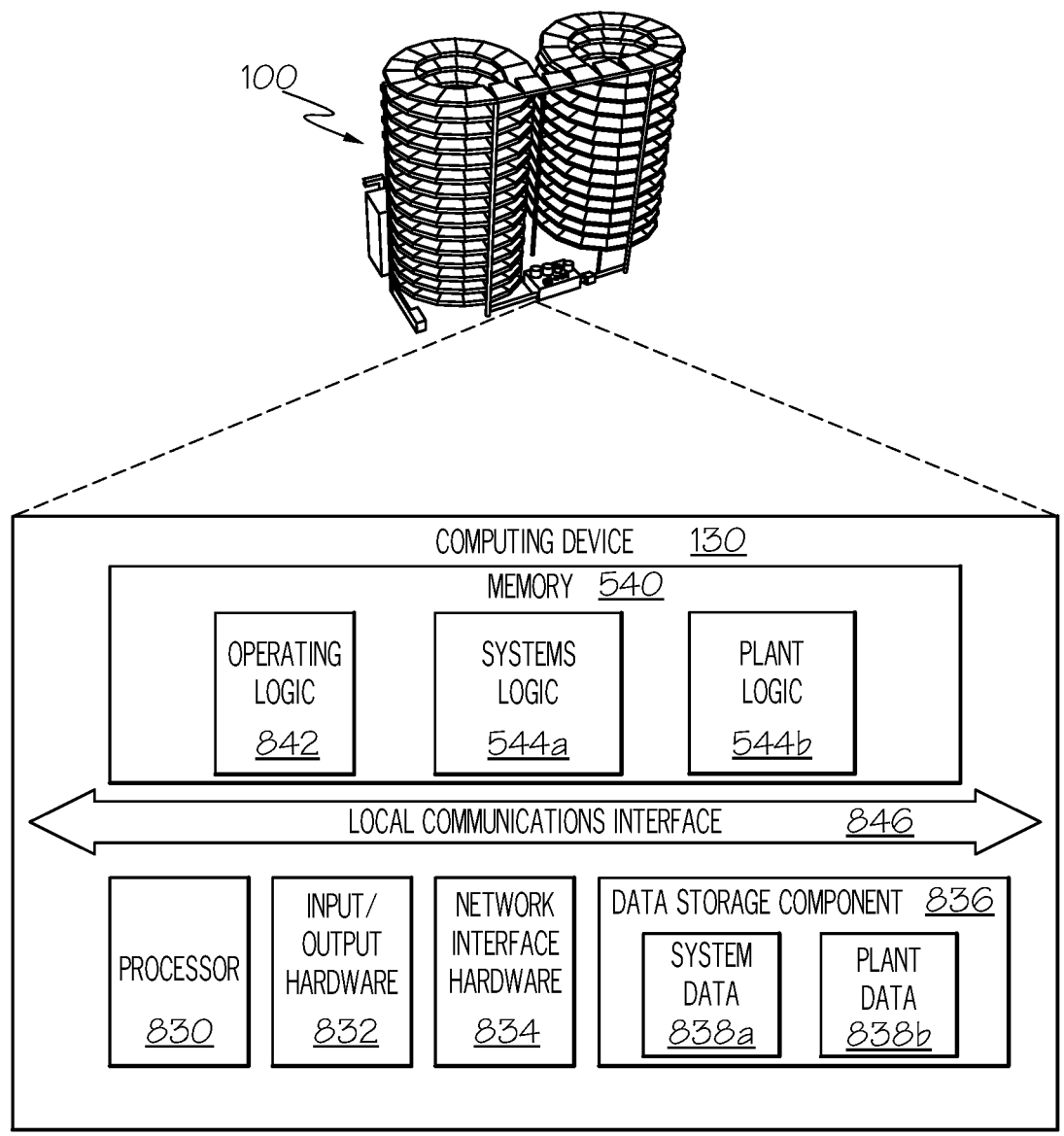
FIG. 8 depicts a computing device for an assembly line grow pod, according to embodiments described herein.

FIG. 8 depicts a computing device 130 for an assembly line grow pod 100, according to embodiments described herein. As illustrated, the computing device 130 includes a processor 830, input/output hardware 832, the network interface hardware 834, a data storage component 836 (which stores systems data 838*a*, plant data 838*b*, and/or other data), and the memory component 540. The memory component 540 may be configured as volatile and/or non-volatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the computing device 130 and/or external to the computing device 130.

The memory component 540 may store operating logic 842, the systems logic 544*a*, and the plant logic 544*b*. The systems logic 544*a* and the plant logic 544*b* may each include a plurality of different pieces of logic, each of which may be embodied as a computer program, firmware, and/or hardware, as an example. A local interface 846 is also included in FIG. 8 and may be implemented as a bus or other communication interface to facilitate communication among the components of the computing device 130.

The processor 830 may include any processing component operable to receive and execute instructions (such as from a data storage component 836 and/or the memory component 540). The input/output hardware 832 may include and/or be configured to interface with microphones, speakers, a display, and/or other hardware.

The network interface hardware 834 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the computing device 130 and other computing devices, such as the user computing device 552 and/or remote computing device 554.

The operating logic 842 may include an operating system and/or other software for managing components of the computing device 130. As also discussed above, systems logic 544*a* and the plant logic 544*b* may reside in the memory component 540 and may be configured to perform the functionality, as described herein.

It should be understood that while the components in FIG. 8 are illustrated as residing within the computing device 130, this is merely an example. In some embodiments, one or more of the components may reside external to the computing device 130. It should also be understood that, while the computing device 130 is illustrated as a single device, this is also merely an example. In some embodiments, the systems logic 544*a* and the plant logic 544*b* may reside on different computing devices. As an example, one or more of the functionalities and/or components described herein may be provided by the user computing device 552 and/or remote computing device 554.

Additionally, while the computing device 130 is illustrated with the systems logic 544*a* and the plant logic 544*b* as separate logical components, this is also an example. In some embodiments, a single piece of logic (and/or or several linked modules) may cause the computing device 130 to provide the described functionality.

As illustrated above, various embodiments for determining a seed level in a seed tank are disclosed. A seed level managing system includes a seed tank configured to contain seeds, a plurality of seed level sensors placed on a sidewall of the seed tank, a surface detecting sensor, and a controller. The controller includes one or more processors, one or more memory modules, and machine readable instructions stored in the one or more memory modules that, when executed by the one or more processors, cause the controller to: receive first information from the plurality of seed level sensors; receive second information from the surface detecting sensor; and determine a number of the seeds in the seed tank based on the first information and the second information. These embodiments may effectively monitor the level of seeds in seed tanks and replenish seeds in seed tanks in a timely manner.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for harvesting plants. It should also be understood that these embodiments are merely exemplary and are not intended to limit the scope of this disclosure.

What is claimed is:

1. A seed level managing system comprising:
a seed tank that contains seeds;
a plurality of seed level sensors placed on a sidewall of the seed tank;
a surface detecting sensor; and
a controller comprising:
one or more processors;
one or more memory modules; and
machine readable instructions stored in the one or more memory modules that, when executed by the one or more processors, cause the controller to:
receive first information from the plurality of seed level sensors;
receive second information from the surface detecting sensor;
determine a number of the seeds in the seed tank based on the first information and the second information;
receive a rate of seeds being provided in an assembly line grow pod; and
determine a time for supplementing seeds in the seed tank based on the number of seeds in the seed tank and the rate of seeds being provided in the assembly line grow pod.

2. The seed level managing system of claim 1, wherein the plurality of seed level sensors are proximity sensors, and
each of the plurality of seed level sensors transmits a binary code to the controller based on a detection of seeds proximate to corresponding seed level sensor.

3. The seed level managing system of claim 2, wherein the machine readable instructions stored in the one or more memory modules, when executed by the one or more processors, cause the controller to:
determine a reduction rate of seeds in the seed tank based on the binary code received from the plurality of seed level sensors over a period of time.

4. The seed level managing system of claim 1, wherein the machine readable instructions stored in the one or more memory modules, when executed by the one or more processors, cause the controller to:
simulate a three-dimensional shape of seeds in the seed tank based on the first information and the second information; and
determine the number of the seeds based on the three-dimensional shape.

5. The seed level managing system of claim 1, wherein the surface detecting sensor is a LIDAR sensor, and is positioned on a top of the seed tank.

6. The seed level managing system of claim 1, wherein the plurality of seed level sensors are configured to move on the sidewall in a vertical direction.

7. The seed level managing system of claim 1, wherein one seed level sensor of the plurality of seed level sensors performs at least the following:
detect seeds proximate to the seed level sensor; and
move upward on the sidewall in response to detecting the seeds until the seed level sensor detects no seeds proximate to the seed level sensor.

8. The seed level managing system of claim 1, wherein one seed level sensor of the plurality of seed level sensors performs at least the following:
detect seeds proximate to the seed level sensor; and
move downward on the sidewall in response to detecting no seeds proximate to the seed level sensor until the seed level sensor detects seeds proximate to the seed level sensor.

9. A controller for managing a seed level in a seed tank, the controller comprising:
one or more processors;
one or more memory modules; and
machine readable instructions stored in the one or more memory modules that, when executed by the one or more processors, cause the controller to:
receive first information from a plurality of seed level sensors;
receive second information from a surface detecting sensor;
determine a number of the seeds in the seed tank based on the first information and the second information;
receive a rate of seeds being provided in an assembly line grow pod; and
determine a time for supplementing seeds in the seed tank based on the number of seeds in the seed tank and the rate of seeds being provided in the assembly line grow pod.

10. The controller of claim 9, wherein the machine readable instructions stored in the one or more memory modules, when executed by the one or more processors, cause the controller to:
simulate a three-dimensional shape of seeds in the seed tank based on the first information and the second information; and
determine the number of the seeds based on a volume of the three-dimensional shape.

11. The controller of claim 9, wherein the surface detecting sensor is a LIDAR sensor, and is positioned on a top of the seed tank.

12. The controller of claim 9, wherein the machine readable instructions stored in the one or more memory modules, when executed by the one or more processors, cause the controller to:
receive binary codes from the plurality of seed level sensors; and
determine a reduction rate of seeds in the seed tank based on the binary codes received from the plurality of seed level sensors over a period of time.

13. The controller of claim 9, wherein the machine readable instructions stored in the one or more memory modules, when executed by the one or more processors, cause the controller to:

receive indication that one seed level sensor of the plurality of seed level sensors detects seeds proximate to the seed level sensor; and instruct the seed level sensor to move upward on a sidewall of the seed tank until the seed level sensor detects no seeds proximate to the seed level sensor in response to receiving the indication.

14. The controller of claim 9, wherein the machine readable instructions stored in the one or more memory modules, when executed by the one or more processors, cause the controller to:

receive indication that one seed level sensor of the plurality of seed level sensors detects no seeds proximate to the seed level sensor; and instruct the seed level sensor to move downward on a sidewall of the seed tank until the seed level sensor detects seeds proximate to the seed level sensor in response to receiving the indication.

15. A method for managing a seed level in a seed tank, the method comprising:

receiving, by a controller of a grow pod system, first information from a plurality of seed level sensors;

receiving, by the controller of the grow pod system, second information from a surface detecting sensor;

determining, by the controller of the grow pod system, a number of the seeds in the seed tank based on the first information and the second information;

receiving, by the controller of the grow pod system, a rate of seeds being provided in an assembly line grow pod; and determining, by the controller of the grow pod system, a time for supplementing the seeds in the seed tank based on the number of seeds in the seed tank and the rate of seeds being provided in the assembly line grow pod.

16. The method of claim 15, further comprising:

simulating a three-dimensional shape of seeds in the seed tank based on the first information and the second information; and determine the number of the seeds based on a volume of the three-dimensional shape.

17. The method of claim 15, further comprising:

receiving indication that one seed level sensor of the plurality of seed level sensors detects seeds proximate to the seed level sensor; and instructing the seed level sensor to move upward on a sidewall of the seed tank until the seed level sensor detects no seeds proximate to the seed level sensor in response to receiving the indication.

18. The method of claim 15, further comprising:

receiving indication that one seed level sensor of the plurality of seed level sensors detects no seeds proximate to the seed level sensor; and instructing the seed level sensor to move downward on a sidewall of the seed tank until the seed level sensor detects seeds proximate to the seed level sensor in response to receiving the indication.

* * * * *